May 4, 1926.

C. A. FRENCH

VAPORIZING BLUE FLAME BURNER

Filed June 8, 1922

Inventor.
Charles A. French,
By H. P. Doolittle
Atty.

Patented May 4, 1926.

1,582,921

UNITED STATES PATENT OFFICE.

CHARLES A. FRENCH, OF CHICAGO, ILLINOIS, ASSIGNOR TO INTERNATIONAL HARVESTER COMPANY, OF CHICAGO, ILLINOIS, A CORPORATION OF NEW JERSEY.

VAPORIZING BLUE-FLAME BURNER.

Application filed June 8, 1922. Serial No. 566,711.

*To all whom it may concern:*

Be it known that I, CHARLES A. FRENCH, a citizen of the United States, residing at Chicago, in the county of Cook and State of Illinois, have invented certain new and useful Improvements in Vaporizing Blue-Flame Burners, of which the following is a full, clear, and exact specification.

My invention relates to vaporizing blue flame burners and, in the form shown in the drawings, is particularly adapted for use as a pilot burner for heating the main burner in an automotive steam power plant but is not limited thereto, being suitable for use wherever a blue flame burner is desired.

Referring to the drawings—

Figure 1:
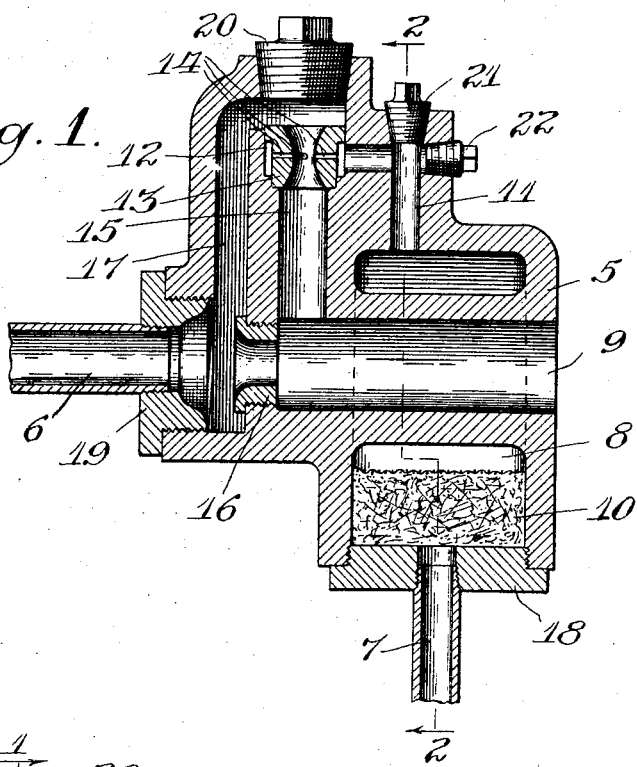
Fig. 1 is a longitudinal section of my burner in what I now believe to be a preferred form, the section being taken on the line 1—1 of Fig. 2.
Figure 2:
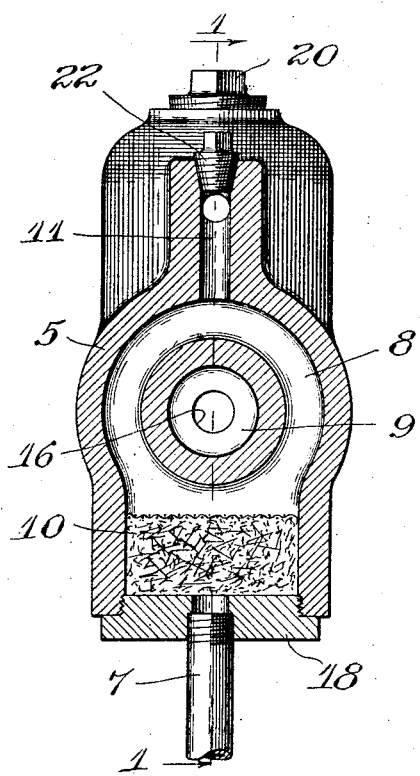
Fig. 2 is a vertical section on the line 2—2 of Fig. 1.

The burner has a body or casing 5 to which air is supplied through a pipe 6 and fuel through a connection 7. The fuel pipe leads to a vaporizing chamber 8 surrounding the combustion chamber 9 and contains a quantity of asbestos wicking or other absorbent material 10 which becomes saturated with the fuel. A passage 11 leads from the vaporizing chamber to an annular passage 12 surrounding a nozzle 13 and communicating with the throat of the nozzle through a number of small orifices 14. The nozzle discharges into a precombustion chamber 15 communicating with the main combustion chamber 9 at one end. The air inlet 6 discharges directly into the combustion chamber 9 through a nozzle 16 in proximity to the precombustion chamber and, before reaching the nozzle 16 has a branch 17 leading to the nozzle 13. Plugs 18, 19, 20, 21 and 22 are screwed into the body 5 in alignment with the several passages and the openings into which they are screwed provide a convenient means for machining the body and afford access to the passages and nozzles for inspection and repair.

In operation, fuel is supplied to the vaporizing chamber through the pipe 7 and saturates the wicking 10. The body 5 is heated by a torch or other external flame to vaporize the fuel and cause the vapors to fill the passages 11 and 12 and enter the nozzle 13 through the openings 14. Air is then supplied at low pressure through the pipe 6, part of it entering the main combustion chamber and part flowing through the passage 17 to the nozzle 13 where it mixes with the vaporized fuel to form a very rich mixture entering the precombustion chamber 15, the supply of air being insufficient for complete combustion. The mixture is then ignited in the precombustion chamber in any one of a number of well known ways such for example as by a torch inserted through the chamber 9. The fuel then burns in the precombustion chamber with a small amount of air, the heat from the combustion being insufficient to break down the fuel but sufficient to insure its rapid and complete combustion in the main combustion chamber 9 on addition of the air coming through the nozzle 16 at a relatively high velocity. The air discharging through the nozzle 16 has an aspirating effect on the chamber 15 and nozzle 13 thereby considerably increasing the discharge of vapor from the vaporizing chamber and the flow of air through the by-pass 17. As soon as the burner is started, heat from the chamber 9 will vaporize the fuel in the wicking 10 which, entering the chamber 15, will burn with sufficient heat to keep the walls of the chambers 9 and 15 hot. If the supply of fuel fails or becomes too small, a flame will burn in the precombustion chamber 15 and keep the burner hot for a considerable length of time or until the fuel stored in the absorbent material 10 is vaporized and consumed.

Having thus described my invention, what I claim as new and desire to secure by Letters Patent is:

1. In a burner, the combination of a casing having a main combustion chamber therein, a vaporizing chamber surrounding the combustion chamber, means for supplying fuel thereto, a precombustion chamber in the casing communicating with the main combustion chamber at one end and having a nozzle at the other, means for conducting vaporized fuel from the vaporizing chamber to the nozzle, means for supplying air to said nozzle to mix with the vaporized fuel in the precombustion chamber, and means for supplying air to the main combustion chamber.

2. In a burner, the combination of a casing having a main combustion chamber, a precombustion chamber and an air nozzle communicating with the main chamber at one end, a fuel vaporizing chamber adjacent the combustion chamber, a nozzle discharging into the precombustion chamber, a passage leading from the vaporizing chamber to the nozzle, and an air inlet passage discharging into both of said nozzles.

3. In a burner, the combination of a casing having a main combustion chamber, a precombustion chamber and an air nozzle communicating with the main chamber at one end, a fuel vaporizing chamber surrounding the main combustion chamber and containing a quantity of absorbent material, a nozzle discharging into the precombustion chamber, a passage leading from the vaporizing chamber to the nozzle, and an air inlet passage discharging into both of said nozzles.

4. In a burner, the combination of a casing having a main combustion chamber, a precombustion chamber and an air nozzle communicating with the main chamber, said air nozzle also communicating with the precombustion chamber, a fuel vaporizing chamber surrounding the combustion chamber, a nozzle discharging into the precombustion chamber from the vaporizing chamber, the air from the air nozzle passing through the main combustion chamber in a manner to draw a burning mixture from the precombustion chamber by aspiration into the main chamber.

In testimony whereof I affix my signature.

CHARLES A. FRENCH.